Figure 1:
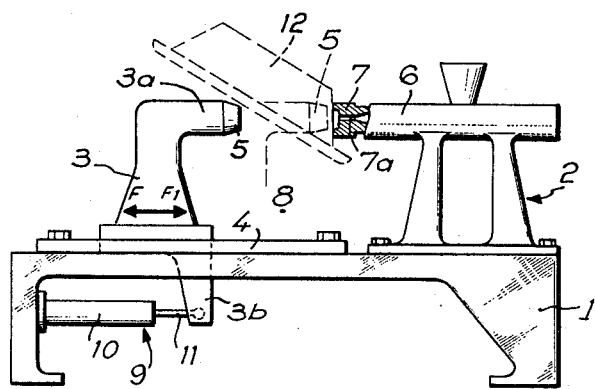

Oct. 12, 1965        R. GROSFILLEX        3,210,804
INJECTION PRESS FOR OVER-MOULDING DECORATIVE PATTERNS
IN PLASTIC MATERIAL ON READY-MADE PLASTIC ARTICLES
Filed May 22, 1963

United States Patent Office 3,210,804
Patented Oct. 12, 1965

3,210,804
INJECTION PRESS FOR OVER-MOULDING DECORATIVE PATTERNS IN PLASTIC MATERIAL ON READY-MADE PLASTIC ARTICLES
Raymond Grosfillex, Arbent, France, assignor to Societe a responsabilite limitee dite Grosfillex Freres, Arbent, France, a French society
Filed May 22, 1963, Ser. No. 282,472
Claims priority, application France, June 14, 1962, 900,663
7 Claims. (Cl. 18—5)

The technique of decorating articles of plastic material by moulding onto an already manufactured article a certain amount of plastic material in a different colour is a well-known one. In actual fact, in order to achieve the over-moulding, the article which has already been formed is replaced in a mould which is practically identical in shape to the initial mould. However, one half of the mould has impressions which are connected to an injection cylinder by means of one or more canals. This method has many drawbacks, because the decoration obtained is usually crude, and in any case, it is necessary to take stringent precautions regarding the size of the canals and impressions, so as to avoid too rapid cooling of the flux introduced into the impressions.

Furthermore, it is not possible to achieve more than one motif on the same article without linking each of them with a band of plastic material, or without providing a separate supply canal for impression of the mould corresponding to each motif. In other words, it is necessary to provide a connection between the various impressions of the same mould, either between the impressions themselves, or through canals leading from the plasticiser.

All these requirements lead to the construction of clumsy moulds which, moreover, can only be used for articles of very definite size and shape, without making it possible to economically mould onto any article different designs which appeal to the user.

The present invention therefore has as its object to provide an apparatus, more particularly a press, which will solve the problems briefly stated above, and which has, moreover, many additional advantages. In particular, by means of the press according to the invention, any preformed article may be over-moulded when desired, at any location thereon, whatever its shape may be, with any decorative design a client requires. Moreover, the conception and characteristics of the machine make it extremely easy to modify the moulding parts for changing the decorative design to be over-moulded on the preformed articles.

According to a primary characteristic of the invention, the press comprises a framework, two uprights, preferably vertical, borne by the framework, a first part constituting a smooth pressure member mounted at the end of one of the uprights, and a plasticiser mounted at the end of the other; a second part constituting an imprinted mould detachably secured to the end of the plasticiser and connected to the latter by a supply canal or opening, with the mould being located opposite to the pressure member. Means are provided whereby the first and second parts may be pressed together, and it is essential that at least one of these two parts constituting the mould and pressure member, should be offset in relation to its upright, in the direction toward the other part, so that an open space is defined between the two parts, their uprights, and the framework of the machine for accommodating the preformed article to be over-moulded.

Finally, it must be emphasised that the imprint mould and the pressure member have smaller dimensions than the article to be over-moulded.

Because of the arrangement of these parts, any portion of an already manufactured article, on which it is desired to apply decoration, may be pressed between the pressure member and the imprint mould.

The procedure thereafter is the same as that with a classic injector press in order to effect the over-moulding proper.

Figure 2:
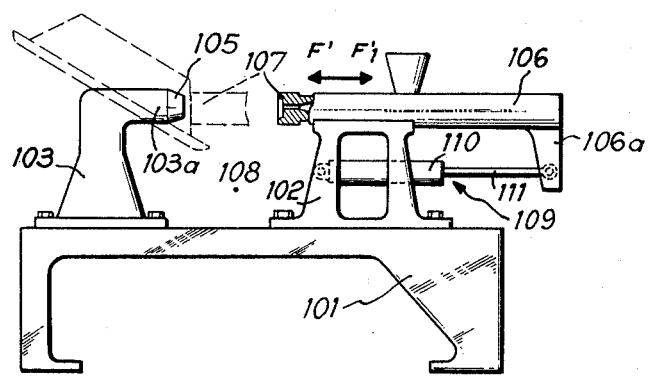

The invention will be more clearly understood from the following description of illustrative embodiments of the invention, given solely by way of example, and with reference to the accompanying drawing, in which:

FIGURE 1 is a schematic side elevational view of a press according to the invention; and FIGURE 2 is a similar view, but showing a variation of the press shown in FIGURE 1.

Referring to the drawing in detail, it will be seen that the press of FIG. 1 comprises a framework 1 supporting two vertical uprights 2 and 3. One of these uprights, for example upright 3, is slidable in the direction of the arrows FF$^1$ along guides 4 which are secured to the framework, so that the upright 3 can be brought towards upright 2, and clamped in any required position.

Solely by way of example, a double acting hydraulic jack 9 is shown in the drawing for effecting movement of the upright 3. The jack 9 has its cylinder 10 attached to the framework 1, and its piston 11 is connected to a bracket 3b fixed to the upright 3.

The upper portion 3a of the upright 3 is shaped to curve horizontally towards the upright 2, and its free end constitutes what will be called the pressure member. However, it is generally preferable to detachably secure on the end of portion 3a a pressure member 5, the surface of which, facing the upright 2 is perfectly smooth.

At the upper end of the upright 2 is mounted the plasticiser 6 having an injection cylinder which is provided at its end directed toward the pressure member 5, with a detachably mounted imprinted mould 7 having a cavity or imprint 7a connected to the injection cylinder of the apparatus 6 by a canal 7b, which is preferably very short. As is shown in the drawing, the end of the plasticiser 6 is brought forward, or projects beyond its upright 2, in the direction toward the upright 3. There is therefore an open space 8, defined, at the bottom by the framework 1, at the top, by the end 3a of the upright 3 and the end of the plasticiser 6, and, at the sides by the uprights 2 and 3 themselves.

With reference now to FIGURE 2, a variation is here shown of the press just described, the same parts being identified by the same reference numbers added to 100.

The uprights 102 and 103 are fixed to the framework 101, while the plasticiser 106 is mounted so as to slide in the direction of the arrows F'F'$_1$ on the upper end of the upright 102. The cylinder 110 of a double acting hydraulic jack 109 is fixed to the upright 102, while its piston 111 is fixed to a bracket 106a secured to the plasticiser 106.

As in the example previously described, the plasticiser 106 bears at its end an imprinted mould 107, situated opposite the pressure member 105, which is itself fixed to the curved or offset upper end 103a of the upright 103.

The press shown in FIGURE 1 functions as follows: If it is desired to mould a decorative motif onto a plastic article 12, which has already been manufactured, the article which is to be over-moulded with the design is placed in contact with the imprinted mould 7, and the pressure member 5 is brought to bear against the opposite side of the article by means of the jack 9. This is possible, whatever portion of the article is to be over-moulded, because the dimensions of the pressure member 5 and the mould 7 are small, and, in any case, smaller than those of the article 12, and, furthermore, the shape of the press, and more particularly the existence of the space 8, allows the article 12 to be placed in any position required. Thereafter the injection of the plastic material for the over-moulding may proceed, and then the pressure member 5 is released by sliding the upright 3 in the direction of the arrow F.

The functioning of the press shown in FIGURE 2 is analogous to that just described, the pressing of the object to be decorated 112, being effected by sliding the plasticiser 106 in the direction of the arrow F by means of the jack 109.

In general, the two opposite surfaces of the pressure member 5 (or 105) and the imprinted mould 7 (or 107) may be flat, that is, with the exception of the cavity 7a of the mould, since because of the elasticity of the plastic material of which the article to be over-moulded is made, it can deform to some extent between the pressure member and mould. Thus, even the wall of a plastic article having a curvature can be over-moulded with the pressure member and imprinted mould having flat surfaces. However, if it is desired to deposit a decorative motif on a very curved part, it would be wise to give the pressure member 5 (or 105) and the imprint mould 7 (or 107) terminal surfaces which are themselves complementarily curved, so as to approximate the curvature of the article to be decorated. In practice, it will be found sufficient to have a set of moulds and pressure members limited in number, the surfaces of which are flat, cylindrical, spherical, or perhaps toric.

The expert will by now be aware of the advantages provided by the invention, which allows the overmoulding of articles already manufactured, without its being necessary to remake complicated and heavy moulds.

Moreover, it will easily be realised that the patterns to be over-moulded may be executed whatever the shape of the ready-made article and practically on any part of this article.

Naturally the invention is not limited to the construction just described, but on the contrary covers all variations. In particular, the means pressing the pressure member 5 (or 105) against the mould 7 (or 107) may take many different forms. By way of example, it is indicated that the two uprights 102 and 103 may be fixed in relation to the framework, and the pressure member may be slidably mounted on its upright 103 for movement towards the mould 107.

I claim:

1. An injection press for over-moulding decorative patterns in plastic material on pre-formed plastic articles which are very substantially larger than the individual patterns to be applied thereto, comprising a framework, two uprights projecting from said framework at spaced apart locations along the latter, a first part constituting a pressure member having a smooth uninterrupted surface and being mounted on the end of one of said uprights remote from said framework, a plasticiser mounted on the other of said uprights at the end of the latter remote from the framework and having a discharge for plastic material to be used in the over-moulding of decorative patterns, said discharge being located at the end of said plasticiser directed toward said pressure member, a second part constituting a mould detachably mounted on said end of the plasticiser in alignment with said first part and having a mould cavity in the surface thereof facing said first part and which communicates with said discharge of the plasticiser, said surface of the mould and said surface of the pressure member having areas only slightly larger than the extent of said cavity and thus very substantially smaller than the article to be over-moulded, at least one of said first and second parts being substantially offset relative to its respective upright in the direction toward the other of said parts so that the latter, said uprights and said framework define an open space therebetween, and means for effecting relative movement of said first and second parts toward and away from each other so that a preformed plastic article extending into said space can have a minor portion gripped between said pressure member and mould for receiving a decorative pattern.

2. An injection press as in claim 1; wherein said uprights are fixed to said framework, and one of said first and second parts is fixed to the respective upright while the other of said parts is mounted for movement relative to its upright in directions toward and away from said one fixed part.

3. An injection press as in claim 1; wherein said first and second parts are fixed relative to the respective uprights, and one of said uprights is fixed relative to said framework while the other upright is movable along the framework to permit said relative movement of the parts.

4. An injection press as in claim 1; wherein said smooth surface of the pressure member and said surface of the mould around said cavity are substantially flat.

5. An injection press as in claim 1; wherein said smooth surface of the pressure member and said surface of the mould around said cavity are sections of complementary spheres.

6. An injection press as in claim 1; wherein said smooth surface of the pressure member and said surface of the mould around said cavity are sections of complementary cylinders.

7. An injection press as in claim 1; wherein said smooth surface of the pressure member and said surface of the mould around said cavity are sections of complementary toroids.

References Cited by the Examiner
UNITED STATES PATENTS

| | | | |
|---|---|---|---|
| 3,018,519 | 1/62 | Morin et al. | 18—36 |
| 3,049,766 | 8/62 | Buckminster | 22—58 |

J. SPENCER OVERHOLSER, *Primary Examiner.*

MICHAEL V. BRINDISI, *Examiner.*